(No Model.)
C. J. PHILLIPS.
FILTER.
No. 526,817. Patented Oct. 2, 1894.
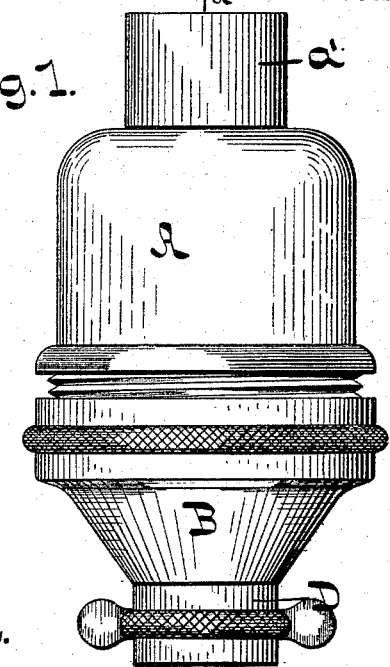
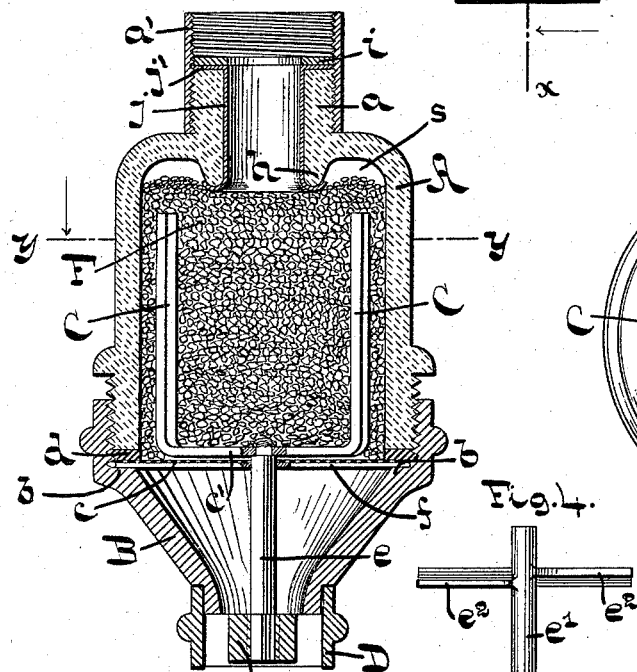
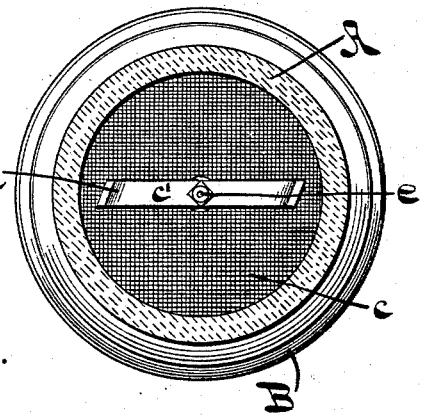
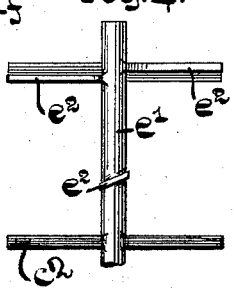
WITNESSES:
INVENTOR:
Cornelius J. Phillips,
BY
ATTORNEY

UNITED STATES PATENT OFFICE.

CORNELIUS J. PHILLIPS, OF NEW YORK, N. Y.

FILTER.

SPECIFICATION forming part of Letters Patent No. 526,817, dated October 2, 1894.

Application filed June 30, 1893. Serial No. 479,252. (No model.)

*To all whom it may concern:*

Be it known that I, CORNELIUS J. PHILLIPS, a citizen of the United States, and a resident of New York, in the county and State of New York, have invented certain new and useful Improvements in Filters, of which the following is a specification.

My invention relates to improvements in filters and especially to filters adapted for hydrant purposes in private residences and other places.

It has for its object to provide at a low cost a filter which can be readily cleansed without removal from the faucet, and to this end it consists essentially in a filter provided with an attached agitator entering from below and causing the accumulating impurities to pass through or about the filtering material when operated.

The nature of my said invention will best be understood when described in connection with the accompanying drawings, in which—

Figure 1 represents an elevation of a filter constructed according to my invention. Fig. 2 is a vertical section on the line $x\,x$, Fig. 1. Fig. 3 is a horizontal section on the line $y\,y$, Fig. 2. Fig. 4 is a detail view of a modified form of agitator, part being broken away.

Similar letters of reference designate corresponding parts throughout the several views of the drawings.

Referring to the drawings, the letter A designates the body of the filter made in this instance of glass and having at its upper end a reduced neck $a$ to which is attached an internally threaded sleeve coupling $a'$ adapted to attach the filter to the nozzle of the faucet.

To the lower end of the body A is secured by suitable screw threads, a metallic discharge nozzle B provided with an internal offset $b$ between which and the end of the body is clamped a foraminous diaphragm or screen $c$ closing the lower end of the body and supporting the filtering material F.

A rubber washer $d$ is interposed between the foraminous diaphragm $c$ and the body to prevent leakage at the joint.

The agitator consists in this example of a yoke-shape piece C having its arms extending upwardly and parallel to the wall of the body A and in close proximity thereto; said arms being bent or twisted transversely to increase their action.

The transverse part $c'$ of the yoke is arranged contiguous to the foraminous diaphragm $c$ and has secured thereto a downwardly projecting shank $e$ provided with a bearing at its upper end in a bridge $f$ of the nozzle B, while its lower end is secured in the bridge $g$ of a thimble D fitted to turn upon the lower end of the nozzle B. The thimble may be omitted and the end of the shank provided with a suitable head whereby it may be turned. However, I prefer to use the thimble since it serves to guide and steady the agitator.

To prevent overfilling of the filter with the quartz, or other filtering material, which may cause the agitator to turn hard, an inwardly projecting annular flange $h$ is formed at the base of the neck $a$, thus leaving an annular clearance space $s$ into which the material can crowd when the agitator is turned.

To prevent the neck of the filter from being broken, in case it is neglected to insert the usual rubber washer $i$, the outer face of the neck is protected by a fast metallic washer $j'$, forming the upper part of a sleeve $j$ expanded at its inner end to the annular flange $h$.

The form of the agitator may be varied from that just described. For instance, the agitator may be made in the form shown in Fig. 4, where it consists of a central spindle $e'$, having two or more series of radially projecting arms or blades $e^2$, and a scraper as $c^2$ corresponding to the portion $c'$ of the yoke,— the essential feature being that the agitator is operated from below, or opposite to the attaching end of the filter, and can be so operated without removing the filter from the faucet.

The impurities accumulating at and near the upper or most exposed portion of the filtering material, can be quickly washed down by turning the agitator, while at the same time the transverse portion $c'$ scrapes and keeps the foraminous diaphragm free from obstructions.

While I have herein shown a filter composed in part of glass, it is evident that the same can be made entirely of metal, and also that the filter can be provided with any well known frictional means for securing it to faucets not provided with threaded nozzles.

The form of the discharge nozzle B is immaterial,—the main functions of this part being to contract the discharge opening to the normal one, to secure the diaphragm and to afford bearings for the shank e and thimble D.

What I claim as new, and desire to secure by Letters Patent, is—

1. A filter comprising a body provided at its top with means for attaching it to a faucet, a foraminous diaphragm closing the bottom of the body, a discharge nozzle B attached to the body below the diaphragm, a yoke shaped agitator C having its arms arranged substantially parallel with the wall of the body and its transverse portion with the diaphragm, and provided with a downwardly projecting shank extending through the diaphragm and guided in the discharge nozzle; and a thimble attached to the shank and guided on the nozzle for turning the shank from below, substantially as and for the purpose set forth.

2. A filter comprising a glass body A terminating at one end in a neck a, a threaded coupling sleeve a' secured to said neck, a foraminous diaphragm c closing the opposite end of the body, a nozzle B attached to the latter end, an agitator C consisting of a shank e extending through the diaphragm and having a bearing in the nozzle, a transverse portion, and upwardly projecting arms, and a thimble or equivalent device attached to the shank and guided on the nozzle, substantially as described.

3. The combination with the glass body A terminating at one end in a neck a, of a threaded coupling sleeve a' secured to said neck, an internal metallic sleeve j containing a flange j', and a foraminous diaphragm c closing the lower end of the body, substantially as described.

4. In a filter, the combination of the body A, provided at one end with means for attaching the same to a faucet, a nozzle B attached to the opposite end, a diaphragm c between the body and the nozzle, an agitator C having a shank e extending through the diaphragm and nozzle and having a bearing in the latter, and a thimble D attached to the shank and guided on the nozzle, substantially as described.

In testimony that I claim the foregoing as my invention I have signed my name, in presence of two witnesses, this 26th day of June, 1893.

CORNELIUS J. PHILLIPS.

Witnesses:
 H. W. HELFER,
 KLAS H. TERNSTEDT.